United States Patent
Bronstein et al.

(10) Patent No.: US 8,165,204 B2
(45) Date of Patent: Apr. 24, 2012

(54) RESOURCE ALLOCATION FOR FRAME-BASED CONTROLLER

(76) Inventors: Michael Bronstein, Santa Clara, CA (US); Alexander Bronstein, San Jose, CA (US)

( * ) Notice: Subject to any disclaimer, the term of this patent is extended or adjusted under 35 U.S.C. 154(b) by 1091 days.

(21) Appl. No.: 12/040,788

(22) Filed: Feb. 29, 2008

(65) Prior Publication Data
US 2009/0219993 A1    Sep. 3, 2009

(51) Int. Cl.
*H04N 11/04* (2006.01)
(52) U.S. Cl. ................................... 375/240.03
(58) Field of Classification Search .......... None
See application file for complete search history.

(56) References Cited

U.S. PATENT DOCUMENTS

| | | | |
|---|---|---|---|
| 7,103,669 B2 * | 9/2006 | Apostolopoulos | 709/231 |
| 2009/0110081 A1 * | 4/2009 | Boice et al. | 375/240.26 |
| 2011/0026584 A1 * | 2/2011 | Zhang et al. | 375/240.02 |
| 2011/0075729 A1 * | 3/2011 | Dane et al. | 375/240.03 |

* cited by examiner

*Primary Examiner* — Man Phan
*Assistant Examiner* — Nourali Mansoury
(74) *Attorney, Agent, or Firm* — Stephen E. Zweig (57) ABSTRACT

A method for resource allocation for video encoder to achieve optimal picture quality within a given resource budget. Making a video encoder utilize the computational complexity, bitrate and other resources in an optimal way while maintaining optimal quality is a complicated optimization problem. A subset of this resource allocation problem, optimizing the tradeoff between bitrate versus quality is called rate-distortion optimization and is performed in most modern encoders. In order to achieve a computationally practical solution of the resource allocation problem, the current invention partitions the video content into a number of regions based on their characteristics and assesses resource allocation among regions to achieve the optimal quality within the resource budget limit. To maintain the computation tractable, the invention relies on bit production model and distortion model for the underlying video content to assess the quality and resource usage instead of actually conducting video compression. An iterative optimization algorithm has been developed to implement the invention.

61 Claims, 6 Drawing Sheets

TEXTURE COMPLEXITY

FIG. 3A

TARGET PSNR OFFSET

FIG. 3B

REGIONS

RESOURCE ALLOCATION FOR FRAME-BASED CONTROLLER

BACKGROUND

The invention relates to the field of video compression, or more particularly, video encoder control and resource allocation to optimize video quality while maintaining the utilized resources under given constraints.

Video data can be thought of as a three-dimensional array of color pixels. Two dimensions serve as spatial (horizontal and vertical) directions, and the third dimension represents the time domain. A frame is a still picture corresponding to a single point in time. Video data often contains spatial and temporal redundancy. Spatial redundancy refers to the fact that small portions of a frame are usually similar to neighboring portions within the same frame. Temporal redundancy is expressed in two subsequent frames being similar up to displacement of objects due to motion.

Video compression takes advantage of these redundancies, trying to reduce the size of the video data, while maintaining the content without substantial visible loss. Such compression is referred to as lossy (as opposed to lossless), since the original data cannot be recovered exactly. Most modern codecs (coders/decoders) operate by constructing a prediction of the video frame by using the redundant information. The prediction parameters are usually much more compactly represented than the actual pixels. The predicted frame is usually similar to the original one, yet, differences may appear at some pixels. For this purpose, the residual (prediction error) is transmitted together with the prediction parameters. The error is also usually compactly represented using spatial transform, like the discrete cosine transform (DCT) with subsequent quantization of the transform coefficients. The quantized coefficients and the prediction parameters are then entropy-encoded to further reduce their redundancy.

Inter-prediction accounts for the most significant reduction of the video data size in video codecs. It takes advantage of temporal redundancy, predicting a frame from nearby frames (referred to as reference frames) by moving parts of these frames, thus trying to compensate for the motion of the objects in the scene. The description of the motion (motion vectors) is related to the parameters of the prediction which are transmitted. This type of prediction is used in MPEG-like codecs. The process of producing intra-prediction is called motion estimation. Typically, motion estimation is performed in a block-wise manner. Many modern codecs support motion estimation with blocks of adaptive size.

At the other end of the process, intra-prediction takes advantage of spatial redundancy and predicts portions of a frame (blocks) from neighboring blocks within the same frame. Such prediction usually takes account of spatial structures that may occur in a frame, such as smooth regions and edges. In the latter case, the prediction is directional. Such type of prediction is used in the recent H.264 Advanced Video Codec (AVC) standard and does not appear in previous versions of the MPEG standard.

The actual reduction in the amount of transmitted information is performed in the transmission of the residual. The residual frame is divided into blocks, each of which undergoes a DCT-like transform. The transform coefficients undergo quantization, usually performed by scaling and rounding. Quantization allows the coefficients represented using less precision, thus reducing the amount of information required. Quantized transform coefficients are transmitted using entropy or arithmetic coding by taking into account the statistics of the quantized coefficients. This type of coding is lossless and utilizes further redundancy that may exist in the transform coefficients.

The encoder usually operates with video represented in the YCbCr color space, where the achromatic Y channel is called the luma, and the chromatic channels (Cb and Cr) are called chroma. The chroma is typically downsampled to half frame size in each direction, which is referred to as the 4:2:0 format. Since the human eye is mostly sensitive to achromatic artifacts, major effort is put to try to achieve better quality of the luma rather than the chroma.

The performance of a lossy video codec is measured as the tradeoff between the amount of bits required to describe the data and the distortion introduced by the compression, referred to as the rate-distortion (RD) curve. The RD curve is a curve that prescribes the lowest possible distortion for a given rate. As the distortion criterion, the mean squared error (MSE) of the luma channel is usually used. The MSE is often converted into logarithmic units and represented as the peak signal-to-noise ratio (PSNR), $$p = 10 \log_{10}\left(\frac{y_{max}^2}{d}\right) \tag{1}$$

(here d is the MSE and $y_{max}$ is the maximum allowed value of the luma pixels, typically 255 if the luma data has an 8-bit precision and is represented in the range from 0 to 255.

H.264 AVC is one of recent video compression standards, offering significantly better compression rate and quality compared to the previous MPEG-2 and MPEG-4 standards, and targeted to high definition (HD) content. For example, H.264 delivers the same quality as MPEG-2 at a third to half the data rate. The encoding process can be summarized as follows: a frame undergoing encoding is divided into non-overlapping macroblocks, each containing 16×16 luma pixels and 8×8 chroma pixels (in the most widely used 4:2:0 format). Within each frame, macroblocks are arranged into slices, where a slice is typically a continuous raster scan of macroblocks. Each slice within a frame can be encoded and decoded independently of the others. Main slice types are P, B and I. An I slice may contain only I macroblocks; a P slice may contain P or I macroblocks. The macroblock type determines the way it is predicted. P refers to inter-predicted macroblocks. Macroblocks predicted in this way are usually subdivided into smaller blocks (of sizes 8×16, 16×8, 8×8, 8×4, 4×8 or 4×4). I refers to intra-predicted macroblocks. Macroblocks predicted in this way are divided into 4×4 blocks (the luma component is divided into 16 blocks; each chroma component is divided into 4 blocks). In I mode (intra-prediction), the prediction macroblock is formed from pixels in the neighboring blocks in the current slice that have been previously encoded, decoded and reconstructed, prior to applying the in-loop deblocking filter. The reconstructed macroblock is formed by implementing the decoder in the encoder loop. In P mode (inter-prediction), the prediction macroblock is formed by motion compensation from reference frames. The prediction macroblock is subtracted from the current macroblock. The error undergoes transform, quantization and entropy coding. According to the resulting bit rate and the corresponding distortion, the best prediction mode is selected (i.e., the choice between an I or a P macroblock, the motion vectors in case of a P macroblock and the prediction mode in case of an I macroblock). The residual for the macroblock is encoded in the selected best mode accordingly and the compressed output is sent to the bitstream. The B, or bi-predicted slices are similar to P, with the exception that inter-prediction can be performed from two reference frames.

The operating point on the RD curve is controlled by the quantization parameter, determining the "aggressiveness" of the residual quantization and the resulting distortion. In the H.264 standard, the quantization parameter is an integer in the range from 0 to 51, denoted here by q'. The quantization step doubles for every increment of 6 in q'. Sometimes, it is more convenient to use the quantization step rather than the quantization parameter, computed according to $$q = 0.85 \cdot 2^{\frac{q'-12}{6}}. \quad (2)$$

Since only the decoder is standardized in the MPEG standards, many aspects of the way in which the encoder produces a standard-compliant stream are left to the discretion of a specific encoder design. The main difference among existing encoders is the decision process carried out by the bitrate controller that produces the encoder control parameters. Usually, the encoder parameters are selected in a way to achieve the best tradeoff between video quality and bitrate of the produced stream. Controllers of this type are referred to as RDO (rate-distortion optimization).

Parameters controlled by the bitrate controller typically include: frame type and reference frame or frames if the frame is a P-frame at the sequence level, and macroblock type and quantization parameter for each macroblock at the frame level. For this reason, it is natural and common to distinguish between two levels of bitrate control: sequence- and frame-level. The sequence-level controller is usually responsible for the frame type selection and allocation of the bit budget for the frame, and the frame-level controller is responsible for selection of the quantization parameter for each macroblock within the frame.

In a broader perspective, RD optimization is a particular case of the optimal resource allocation problem, in which the available resources (bitrate, computational time, power dissipation, etc.), are distributed in a way that maximizes some quality criterion. Hence, hereinafter we use the term resource allocation referring to RD optimization-type problems discussed here. The resources we consider specifically are computational time and bitrate, but may also include additional resources such as memory use, power dissipation, etc.

Theoretically, optimal resource allocation can be achieved by running the encoding with different sets of parameters and selecting the best outcome. Such an approach is impossible due to a very large number of possible combinations of parameters together with a high complexity of the single encoding process, which result in prohibitive computational complexity. Suboptimal resource allocation approaches usually try to model some typical behavior of the encoder as function of the parameters; if the model has an analytical expression which can be efficiently computed, the optimization problem becomes practically solvable. However, since the model is only an approximate behavior of the encoder, the parameters selected using it may be suboptimal.

Therefore, it becomes apparent that a computationally feasible and accurate method of optimal resource reallocation is very desirable for video compression. This method will achieve the best visual quality for any given resource constraints. As will be shown, the invention provides such a method and related system.

SUMMARY

The invention provides an approach for computationally-efficient optimal resource allocation problem solution, trying to achieve the best possible quality within limited resource budget.

In an exemplary embodiment of the invention, the video content is partitioned into a number of regions and the resource allocation is performed in a region-wise manner to achieve the optimal quality criterion while maintaining the resource under a given budget. The partition of the video content is based on the observation that optimal resource allocation tend to assign similar parameters to video sub-frame units (e.g., macroblocks) having similar characteristics. Therefore, sub-frame units with similar characteristics can be regarded as a single entity from a resource allocation point of view. On one hand, a large enough number of regions should be selected so that the characteristics of sub-frame units within each region are uniform enough to result in about the same quality with a given resource budget for all sub-frame units in the region. On the other hand, a small enough number of regions should be used so that the complexity of allocation resources among regions is tractable. Where to strike this balance may depend on a particular application, and can be regarded as an additional control parameter influencing the complexity of the controller.

In one embodiment, the quality criterion used may be extended beyond the conventional signal-to-noise ratio (SNR) or peak SNR (PSNR) to visual distortion criteria such as the just-noticeable distortion (JND). JND measures the minimum PSNR below which the distortions will start be noticeable to the typical human observer. Unlike PSNR which is purely mathematical quality criterion, JND takes into consideration the properties of the human visual system and its sensitivity to artifacts of different kind. In a sense, JND defines a PSNR profile, which tells in which portions of the frame the distortion must be lower and in which it can be compromised. Trying to achieve a PSNR profile in a frame will result in more visually pleasant appearance of the compressed video.

In order to further reduce the computation required for finding the optimal resource allocation, a bit production model and a distortion model are employed. Therefore, instead of actually compressing the video content using a set of coding parameters, the quality and resulting bit rate are estimated based on the models. Both the bit production model and distortion model can take into account the underlying picture type, i.e., the I-picture and P-picture, which renders more accurate models for the underlying pictures.

The benefits of the current intention can be easily appreciated by any person skilled in the art of video compression.

DETAILED DESCRIPTION

The goal of video compression, in simple words, is to deliver a video of as high quality as possible using as few bits and utilizing as few computations as possible. Since these desiderata are conflicting, tradeoff between different resources and compression quality is a key problem in video coding. A popular optimization technique used in video compression is referred to as rate-distortion optimization (RDO) which is an optimization process that trades off bit rate with distortion in an optimal sense. Very often, the system design may also be cast as an issue of quality optimization while maintaining the instantaneous bit rate within a specified bandwidth, or alternatively, maintaining the overall video size within a specified capacity. In practice, the target bandwidth be the payload bit rate of a communication channel, and the specified capacity may be the storage capacity of a DVD disk. Therefore, the focus in the design of a video codec becomes designing a control system for finding the encoding parameters that achieve the best quality under the constraint that the bit rate or the total bits are within a budget. The controller functionality can be generalized by extending it to other systems in the video processing datapath (e.g. pre- and post-processing), extending the picture quality criterion to general quality criterion, and extending the bit rate budget to general resource budget. The latter problem is referred to as optimal resource allocation.

Given a set of coding parameters and assessing the resulting quality and resources utilization corresponding to the coding parameters, it is theoretically possible to find the best coding parameters that achieve the optimal quality criterion within the resource constraints. During the optimization procedure, actual compression may be performed for each set of given coding parameters and the quality criterion and the resources used may be calculated based on the actually compressed video. However, such procedure may consume extreme high computational power and becomes impractical. In modern video compression standards such as H.264, the relationship between the quality and the resource (distortion and bit rate) are approximated empirically by an analytic relation. Consequently, the resource allocation problem can be easily solved, but the resulting solution may be suboptimal. Along the same concept, a more elaborate encoder model is established to relate the complexity, distortion and bit rate for different types of pictures (Predicted picture, bi-directionally predicted picture and intra-coded picture, referred P, B and I pictures respectively).

To formulate the resource allocation problem, a set of variables are defined. First, there is a video content Y with a set of encoder parameters, $\Theta$, which may depend on the compression standard and specific encoder implementation. The set of encoder parameters $\Theta$ is used to encode the video content Y to produce an encoded version of the original video content. The actual quality of the encoded video content can be measured by comparing the original video content and the encoded (and then decoded) video content. The utilization of the resources can be measured during or after the encoder operation. The set of encoder parameters $\Theta$ can be thus selected to optimize some quality criterion Q and ensure than the utilized resources R are kept within a budget. However, such an optimization implies that the actual encoding has to be performed with the set of encoder parameters, which can be computationally prohibitive.

To make the problem tractable, a parametric quality and resource utilization model has adopted in some video encodes. For example, a simplified equation relating the bit rate to the SOD (sum of differences) distortion is used in MPEG-4 reference codes for bit rate control. Such parametric model has greatly simplified the optimization process. To make the parametric model more accurate, such parametric equation has to take into consideration of the specific characteristics of the underlying video content. For example, the MPEG-4 reference codes use two different parametric equations; one for intra-coded picture and one for predictive picture. Accordingly, a quality $Q(\Theta;Y;V)$ and resource utilization $\overline{R}(\Theta;Y;V)$ models are defined here as a function depending on the set of encoder parameters, the underlying video content, and some side information, where V is additional side information. The type of intra and predictive picture in the MPEG-4 reference codes case is an example of such side information. Additional side information can include clues extracted from the content itself and helping to classify it for the purpose of quality and resource modeling. In the following, such clues are referred to as visual clues.

With the ground work set up as above, the procedure of quality optimization design can be preceded as follows: To determine optimal encoding parameters that enable an encoder to produce the encoded version of the video content with maximum quality criterion within the resource budget, the optimization problem to be solved is:

$$\Theta^* = \underset{\Theta}{\mathrm{argmax}} Q(\Theta; Y; V) \text{ subject to } \overline{R}(\Theta; Y; V) \leq \overline{R}^0, \quad (3)$$

where $\Theta^*$ is the optimal set of encoder parameters; $\overline{R}(\Theta;Y;V)=(R_1(\Theta;Y,V), \ldots, R_K(\Theta;Y,V))$ is the vector of resources used by the encoder for input video content Y with the set of encoder parameters $\Theta$. Very often, in a conventional video compression system, the bit rate is solely considered as the resource to be constrained, meaning that the vector $\overline{R}(\Theta;Y;V)$ contains only one component. Nevertheless, other resources such as processing time, power dissipation, encoding time, decoding time, data, memory use, memory bandwidth, data redundancy, repeat information, can also be considered.

While the equation (3) is generic and simple, the solution of finding an optimal set of encoder parameters is non-trivial and requires extensive computation. In many video compression systems, the encoder parameters are specified for smaller picture units, named sub-frame units in this description. In MPEG and H.264 standards, macroblock or block have been used as the sub-frame unit and encoding parameters are applied on the basis of macroblock and block. The above optimization process as depicted in equation (3) would involve an extremely high degree of complexity because a video content may consist of a large number of macroblocks or blocks. Consequently, an optimization based on equation (3) would be extremely difficult.

One observation on video compression is that sub-frame units having similar characteristics are often assigned similar encoder parameters by optimal resource allocation according to equation (3). Therefore, the sub-frame units with similar characteristics may be grouped together to form a Region and the video content can be divided into a reasonable number of regions. The resource allocation problem can be thus performed in a region-wise manner, thus reducing the number of variables from a multiple of the number of sub-frame units to the number of regions for the ease of processing. For example, a high-definition video frame contains thousands of macroblocks, while the number of similar regions can be kept around ten. According to the invention, a process is provided for partitioning the video content into regions based on similarity in characteristics. This process can significantly reduce the computational load of finding an optimal solution to the optimization problem depicted in equation (3).

Figure 1A:
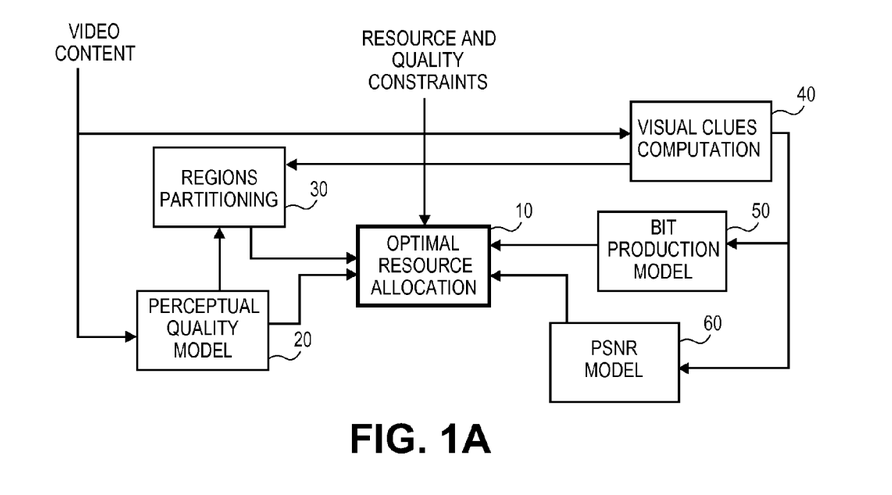
FIG. 1a shows a block diagram of the optimal resource allocation for video content configured according to the invention.

An exemplary optimal resource allocation process is shown in FIG. 1a, where a video content and resource/quality constraints are inputs to the system. The resource considered herein is the number of bits. However, this is only used for illustration, and the invention is not limited to just bits for resources, but can extend to other resources, including a bit budget, limited processing time, limited power dissipation, limited encoding time, limited decoding time, limited data, limited memory use, limited memory bandwidth, limited data redundancy, limited repeat information, and other resources. The video content can be a video sequence, a video frame, a video field, or a partial frame. The video content is fed to Perceptual Quality Model 20 and Visual Clues Computation 40. Perceptual Quality Model derives its parameters based on the input video content. On the other hand, the Visual Clues Computation also derives the visual clues based on input video content. The information from Perceptual Quality Model and the information from the Visual Clues Computation are used to guide partitioning the input video content. The partitioning is based on a unit smaller than the input video content, such as a macroblock, macroblock pair, or block. The smaller unit for the partitioning is named sub-frame. The information from the Visual Clues Computation is used by both the Bit Production Model 50 and PSNR Model 60. Both the Bit Production Model and the PSNR Model are useful for the encoder to evaluate the performance (bit rate and PSNR) without actually going through the computationally heavy encoding process. While the Bit Production is used as a measure of resource, any other resource measurement such as processing time can be used. Similarly, other quality model such as distortion can be used. The Optimal Resource Allocation 10 then exercises optimal resource allocation among the regions using the Bit Production Model, PSNR Model, and Perceptual Quality Model.

Figure 1B:
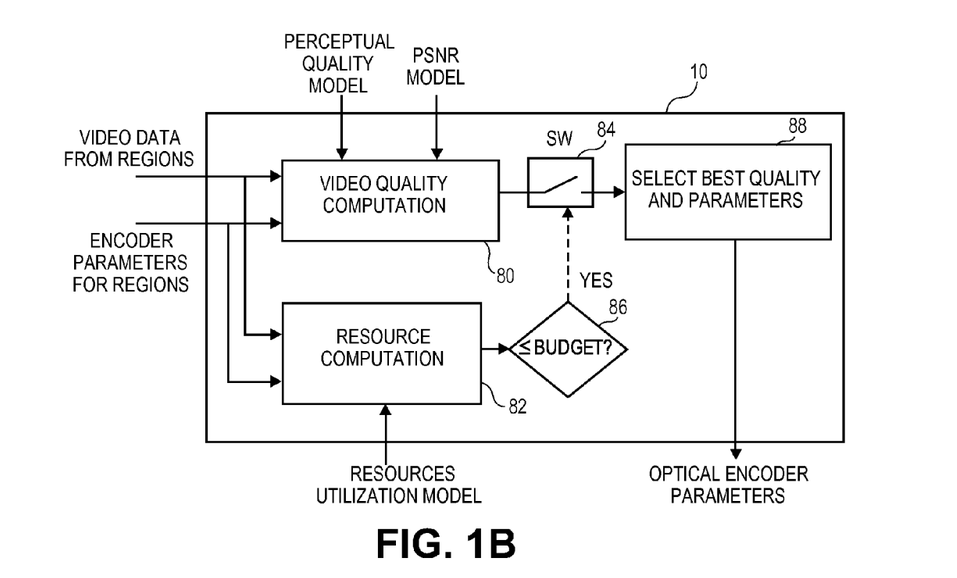
FIG. 1b shows a general optimal resource allocation process configured according to the invention.

The detailed process of the Optimal Resource Allocation 10 is further explained in FIG. 1b. The Video Quality Computation 80 block estimates the video quality of the video data of regions for the set of given encoder parameters instead of actually compressing the video data using encoder parameters. The particular video quality criterion used in this exemplary case is the PSNR Shaping criterion, measuring the fitting of the PSNR to a PSNR profile derived from the perceptual quality model. The Resource Computation 82 block estimates the resource consumed for the given set of encoder parameters instead of actually compressing the video data. The bit production model is used to estimate the resource consumed. The estimated resource is compared in the compare process "≦Budget?" block 86. If the result is true, the Switch 84 will close to allow the corresponding estimated quality computation pass to the Select Best Quality and Parameters block 88. The Select Best Quality and Parameters block will compare all the video quality results entering the block and will select the best quality value and output the corresponding encoder parameters.

Figure 1C:
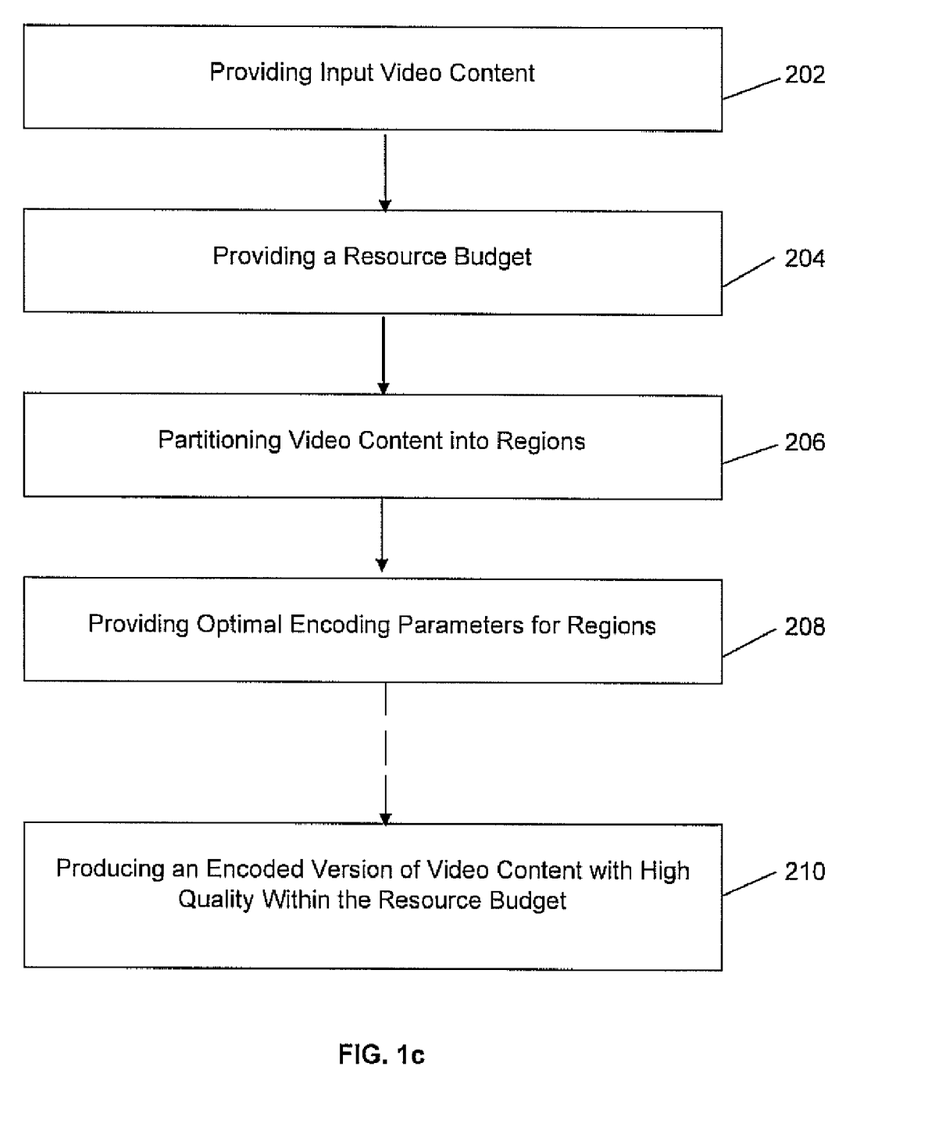
FIG. 1c shows a method configured according to the invention.

Referring to FIG. 1c, one method of the invention is illustrated. Generally, a method configured according to the invention includes, after providing video content in step 202 and a resource budget in step 204, the video content is partitioned into requires in step 206. Optimal encoding parameters are then provided to the regions in step 208. Encoded video within the resource budget may then be provided in step 260.

Upon partitioning of the video content, the original optimization problem in equation (3) becomes a region-wise resource allocation problem. The step of finding encoding parameters to enable an encoder to produce the encoded version of the video content with maximum quality criterion within the resource budget is performed by solving the optimization problem $$\{\vartheta_1^*, \ldots, \vartheta_L^*\} = \underset{\{\vartheta_1^*, \ldots, \vartheta_L^*\}}{\operatorname{argmax}} f(q_1(\vartheta_1; y_1, v_1), \ldots, q_L(\vartheta_L; y_L, v_L)) \quad (4)$$

$$\text{subject to } \sum_{l=1}^{L} \bar{r}_l(\vartheta_l; y_l, v_l) \leq \bar{R}^0,$$

where $\{\theta^*_1, \ldots, \theta^*_L\}$ is the optimal set of encoder parameters for the regions; $\bar{r}_l(\theta_l; y_l, v_l)$ is the vector of resources used by the encoder for encoding the input video content $y_l$ in region 1 with the set of encoder parameters $\theta_l$; $q_l(\theta_l; y_l, v_l)$ is the video quality criterion in region 1 as the result of encoding of video content $y_l$ with the set of encoder parameters $\theta_l$, $v_l$ is the additional information associated with region 1, and f is some aggregation function.

The aggregation function decides how the overall quality is derived from the quality in individual regions. In a simplest form, the aggregation function can be a summation operation of individual quality:

$$f(q_1, \ldots, q_L) = \sum_{l=1}^{L} q_l. \quad (5)$$

Other forms of aggregation functions can also be used. For example, a weighted linear combination of the individual quality:

$$f(q_1, \ldots, q_L) = \sum_{l=1}^{L} w_l q_l, \quad (6)$$

where $w_l$ is a weighting factor for each region. The choice of weighting factor is a design parameter. In this invention, the weighting factor is chosen to be proportional to the region size. Nevertheless, other weighting factors may be used, and this will be understood by those skilled in the art.

In order to keep the region-wise optimization problem tractable, the number of regions should be small. On the other hand, the region-wise problem (4) can be regarded as an approximation of the full sub-frame unit-wise problem (3), where the approximation quality depends on the number of regions. Thus, the number of regions should be large enough to have the simplified problem approximate well the original one. The choice of the number of regions depends on the computational load that a system can handle or the designer is willing to allocate. More regions will provide a more accurate solution at the expense of more computation. In practice, seven different regions have been found to be a reasonable compromise between computational load and accuracy. Nevertheless, the current invention can be applied to any number of regions.

The functions describing the dependence of the quality and the resources on the encoding parameters are referred to as encoder model. The main purpose of the encoder model is to estimate the quality and the amount of resources used by the encoder without resorting to the expensive process of encoding itself. Specifically, in one of the preferred embodiments of the invention, the amount of bits produced by the encoder, the distortion as the result of encoding and the time complexity of the encoding process are predicted according to a parametric equation, which can be derived empirically by studying the typical behavior of the encoder with different types of content. However, there may be a few requirements on the encoder model. An encoder model provides explicit expression of predicted values (such as amount of bits, distortion, time, etc.) as function of encoder parameters (q' or q) in order to be used in optimization. The same predictors can be used by sequence- and the frame-level controllers, which imply that the predictors can be applied to data units of different granularity (frame, region of macroblocks or macroblock). The model may also be content-aware, where it takes into consideration different data on which the encoder operates.

In a preferred embodiment of the invention, linear predictors are used in the encoder model. This provides both explicit dependence on the encoder parameters and allows for the use of the predictors on data of any granularity. The predictor coefficients may be found off-line by means of supervised learning and can be adapted during the encoding process. Most of the models employed here depend of the frame type (denoted by f), which can be either P or I. For simplicity of the following discussion, B frames are not addressed and can be assumed to be treated similarly to P frames. Content dependence is captured by means of visual clues, a measure of content complexity, as described below.

Two types of clues are used by predictors in I-frames and P-frames. In I-frames, the visual clue is texture complexity $v_i$, measured as the unbiased standard deviation of luma pixels in each macroblock, $$v_i = \left( \frac{1}{16^2 - 1} \sum_{n \in M_i} \left( y_n - \frac{1}{16^2} \sum_{n \in M_i} y_n \right)^2 \right)^{\frac{1}{2}} \quad (7)$$

where $y_n$ denotes the nth luma pixel, and $M_i$ is the set of pixel indices belonging to macroblock i in the current frame. The intuition behind this measure is that texture in most cases is responsible for intra-prediction errors, which in turn influences the amount of bits produced, the PSNR and the encoding time.

In P-frames, the difficulty of motion compensated prediction should be considered. Let y denote the luma component of the current frame, and y' be the luma component of the reference frame selected by the sequence-level controller. The motion difference is computed as the spatially-smoothed absolute difference of luma pixels in collocated macroblocks in current frame and the reference frame as follows $$m_i = \sum_{n \in M_i} |\sigma(y_n - y_n^t)| \quad (8)$$

This is used as the measure of predictability and consequently, of inter-prediction difficulty. Here, $\sigma$ denotes spatial smoothing operation by means of a low-pass (e.g. Gaussian) filter. The motion complexity $$u_i = \sqrt{m_i v_i} \quad (9)$$

is used as the visual clue for P-frames

The purpose of the bit production model is to predict the amount of bits produced by the encoder while encoding a data unit, the lowest granularity being a macroblock. Bit production models knows to these skilled in the art and discussed in conversation literature assume that the number of bits required to encode a macroblock is inversely proportional to the quantization step in this macroblock or its square ($b_i \propto q^{-1}$ or $b_i \propto q^{-2}$), the latter referred to as the quadratic model as described in the article entitled *A new rate control scheme using quadratic rate distortion model* by T. Chiang, Y. Q. Zhang, and D. S. R Center. Published in IEEE Trans. Circuits and Systems for Video Technology, pp. 246-250, 1997. Such models do not take into consideration the content of the macroblock and consequently, produce relatively large errors. More advanced models try to employ the dependency of $b_i$ on the residual image produced as the result of motion estimation, expressed as mean absolute difference (MAD). The disadvantage of such approach is that MAD is computed during motion estimation, which means that the prediction of the amounts of bits is obtained during the encoding process and not beforehand, which is not suitable for a controller scheme configured according to the invention. As a result, it is not possible to perform optimal pre-allocation of resources. Alternatively, a pre-coding scheme can be used, in which the MAD is produced before the encoding, usually by applying the encoding process to a lower resolution frame. Such an approach is implemented in some software H.264 encoders, for example, in X.264. Pre-coding is usually computationally intensive and its use in real-time hardware codecs is impractical.

According to the invention, a model based on the visual clues pre-computed prior to encoding is utilized. A distinction is made between I-frames and P-frames. For I-frames, the amount of bits in a macroblock is proportional to $q^{-1}$ and the texture complexity $v_i$. For P-frames, the amount of bits is proportional to $q^{-1}$ and the motion complexity $u_i$. To simplify the notation, we denote frame-type dependent visual clues are denoted by the following:

$$z_i^f = \begin{cases} u_i & \text{if } f \text{ is } P \\ v_i & \text{if } f \text{ is } I \end{cases} \quad (10)$$

Those are referred to herein as "visual clues". In the following, we will omit the index f is omitted wherever possible in order to simplify the notation. Thus, the predicted amount of bits required to encode macroblock i in frame of type f is given by $$\hat{b}_i^f(z_i^f, q_i; \alpha^f) = \alpha_1^f + \alpha_2^f z_i^f q_i^{-1}, \quad (11)$$

where $\alpha^f = (\alpha_1^f, \alpha_2^f)^T$ are non-negative frame-type dependent and macroblock-independent bit production model coefficients. Denoting $\bar{\alpha}_i^f = (\alpha_1^f, \alpha_2^f z_i^f)^T$, we obtain the following expression for the predicted bits in macroblock i, $$\hat{b}_i^f(q_i; \bar{\alpha}_i^f) = \bar{\alpha}_{i1}^f + \bar{\alpha}_{i2}^f q_i^{-1} \quad (12)$$

which is linear in $q^{-1}$ and has frame-type and macroblock-dependent coefficients.

The purpose of the distortion model is to predict the objective distortion (luma PSNR) of the video data as the result of encoding. Empirical evidence has shown that PSNR in a macroblock undergoing an encoding process is approximately inversely proportional to the quantization parameter in that macroblock ($p_i \propto -q'_i$). This model, however, does not take into consideration the content of the macroblock. We use an extended PSNR model, in which PSNR is also inversely proportional to the texture complexity ($p_i \propto -v_i$) which concords to the intuition that rich texture undergoes more significant quality degradation as the result of encoding). Introducing such a dependency on texture complexity allows us to improve the PSNR prediction accuracy (in the sense of absolute error) by over 50% compared to a model dependent only on $q'_i$.

According to one model configured according to the invention, the predicted PSNR value in macroblock i is given independently of the frame type by $$\hat{p}_i(v_i, q'_i; \beta) = \beta_1 - \beta_2 v_i - \beta_3 q'_i, \qquad (13)$$

where $\beta = (\beta_1, \beta_2, \beta_3)^T$ are non-negative PSNR model coefficients, constant for each macroblock. Denoting $\bar{\beta}_i = (\beta_1 - \beta_2 v_i - \beta_3)^T$, we obtain the following expression for the predicted PSNR is derived, $$\hat{p}_i(q'_i; \bar{\beta}_i) = \bar{\beta}_{i1} + \bar{\beta}_{i2} q'_i, \qquad (14)$$

which is linear in $q'_i$ and has macroblock-dependent coefficients.

The purpose of the perceptual quality model is to quantify the distortion of the video after encoding as perceived by the human observer. Unlike PSNR, visual distortion is a subjective criterion, and as a result, may vary among different people. It is however well-known from psychophysical research that in images with certain characteristics, the distortion is less noticeable than in others for most human observers. JND is defined as the threshold on the distortion, below which encoding artifacts are unnoticeable to the human eye. Due to the tradeoff between bitrate and distortion, it is usually hard or even impossible to achieve JND during video encoding. However, the perceptual model can still be used in order to achieve the minimally noticeable distortion (MND), such that the encoding artifacts are minimally visible in the image that has undergone encoding, and are uniformly distributed across the image.

The perceptual quality model is used here to drive the resource allocation, particularly, to decide in which macroblocks that more bits must be allocated such that a constant visual distortion is achieved. It is assumed that the JND for macroblock i, expressed as the mean squared error (MSE), is given by $d_i^0$. This implies that, if the MSE $d_i$ in macroblock i is below $d_i^0$, the distortion will be unnoticed. Since in practice, $d_i > d_i^0$, it is desired that the distortion be uniform across the frame, i.e. have $d_i = v \cdot d_i^0$, where v is some factor constant for the entire frame. We can thus say, for example, that in, a certain frame, the distortion is twice the JND. Ideally, v should be as small as possible.

Using the transformation (1), the following formula is derived:

$$10 \log_{10}\left(\frac{y^2 \max}{v \cdot d_i^0}\right) = 10 \log_{10}\left(\frac{y^2 \max}{v}\right) + 10 \log_{10}\left(\frac{y^2 \max}{d_i^0}\right) \qquad (15)$$
$$= p_0 + \Delta p$$

The term $p_0$ is the PSNR offset and $\Delta p$ the PSNR shape. In order to produce a minimally noticeable distortion, the encoder should achieve PSNR as close as possible to $p_0 + \Delta p$ in each macroblock i, and $p_0$ should be as large as possible There exist numerous models for JND in commonly known literature. The common trait of such models is sensitivity to local contrast of the frame and local directional frequencies. Typically, the response of the human eye is modeled as a band-pass filter, where the highest sensitivity (and consequently, the lowest JND) is in the mid-range of contrast and frequency. Specifically, here we use the model described in the article entitled *A perceptually tuned subband image coder based on the measure of just-noticeable distortion profile*, by C. H. Chou and Y. C. Li, IEEE Trans. Circuits and Systems for Video Technology, 5(6):467-476, 1995.

Now, with the Bit Production Model (eq. 12), PSNR Model (eq. 14), and the Perceptual Quality Model (eq. 15) derived above, the frame-level controller issue can be revisited. The first and the main purpose of the frame-level controller is to ensure that the bit budget allocated to the frame by the sequence-level controller is utilized as precisely as possible. The bit budget allocated by the sequence-level controller assumes a constant quantization parameter in all the macroblocks of the frame. Hence, the second purpose of the frame-level controller is to refine this allocation. The refinement criterion is the proximity to the desired PSNR shape obtained from the visual model. The quantization parameter in each macroblock is selected in such a way that, as a result, the number of bits equals the frame bit budget $b_T$ allocated by the sequence-level controller, and the predicted PSNR in macroblock i is as close as possible. to the desired shape $p_0 + \Delta p$. This problem is known as PSNR shaping.

Ideally, the selection of the quantization parameter should be done in a macroblock-wise manner. However, such an allocation is usually expensive, since the number of macroblocks is large (for example, a full HD frame contains 8160 macroblocks). If a macroblock-wise selection of the quantization parameter is performed, it will typically appear that its values are region-wise constant: in regions with similar properties, the value of the quantization parameter is the same. Such regions are usually continuous, but may contain disconnected components. In the following, we use the term "region" referring to a generic collection of macroblocks, not necessarily continuous in space. If it was possible to identify such regions in advance, and, according to the invention, those macroblocks are could significantly reduce the number of variables in the PSNR shaping problem.

Consider the selection of the optimal quantization parameter in a macroblock. Since the bit budget is a constraint on the total amount of bits required to encode the frame, it is reasonable to assume that changing the quantization parameter in a macroblock approximately does not violate the bit budget constraint. In the PSNR shaping problem, we try to select such a value of $q'_i$ in a macroblock i that the predicted PSNR $\hat{p}'$ is as close as possible to the target shape $p_0 + \Delta p$. In turn, according to the distortion model, PSNR is dependent of the texture complexity. Thus, ignoring the bit budget constraints, the locally optimal selection of the quantization parameter is $q'_i = \mathrm{argmin}_{q'_i} |\hat{p}_i(q'_i; v_i) - (p_0 + \Delta p_i)|$. Note that $q'_i$ in this expression depends only on $v_i$ and $\Delta p_i$. It can therefore be concluded that in macroblocks with similar values of $v_i$ and $\Delta p_i$ the value of $q'_i$ will be similar.

Figure 2:
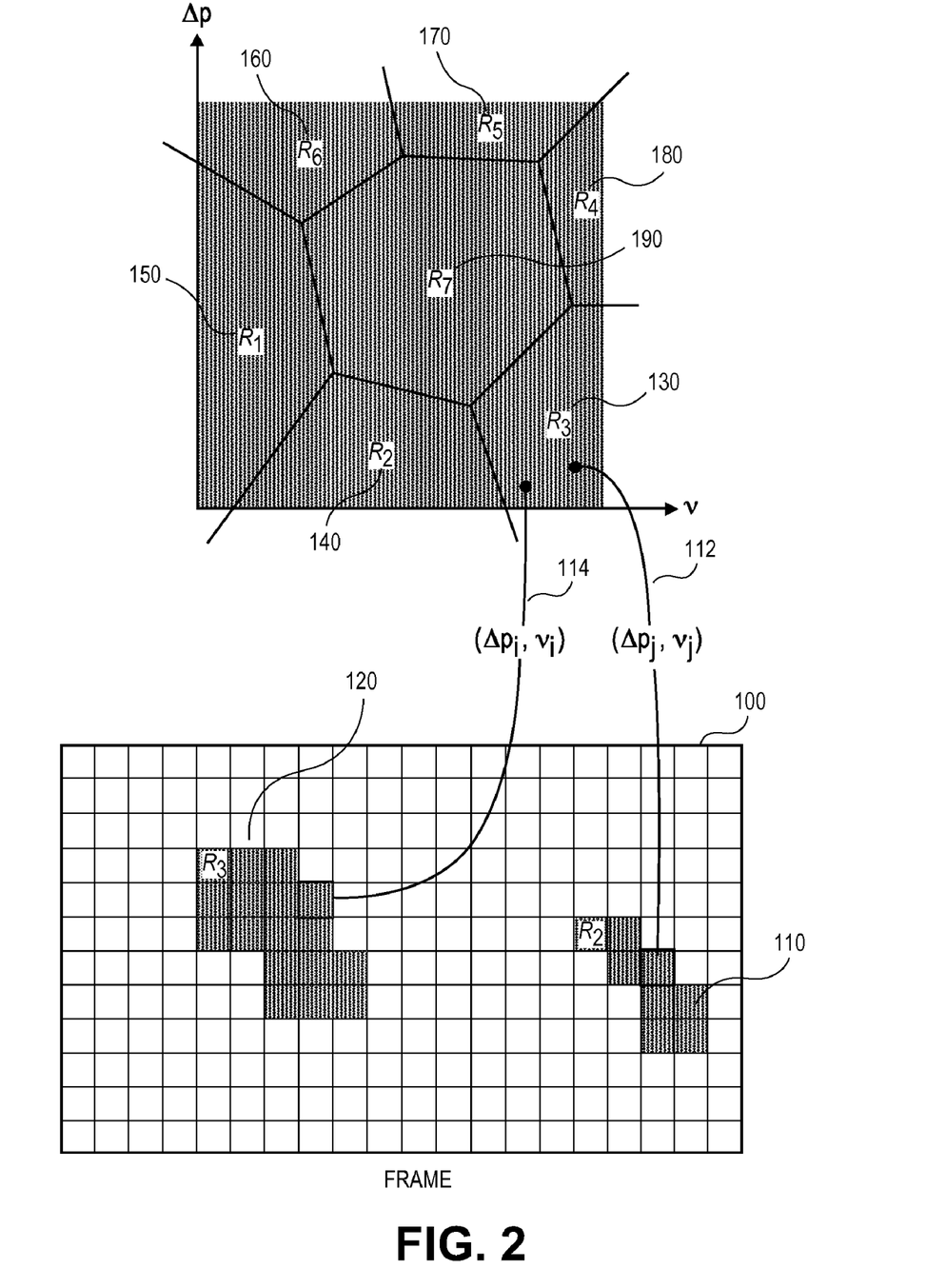
FIG. 2 shows an optimal region partition by using vector quantization configured according to the inventions.
Figure 3A:
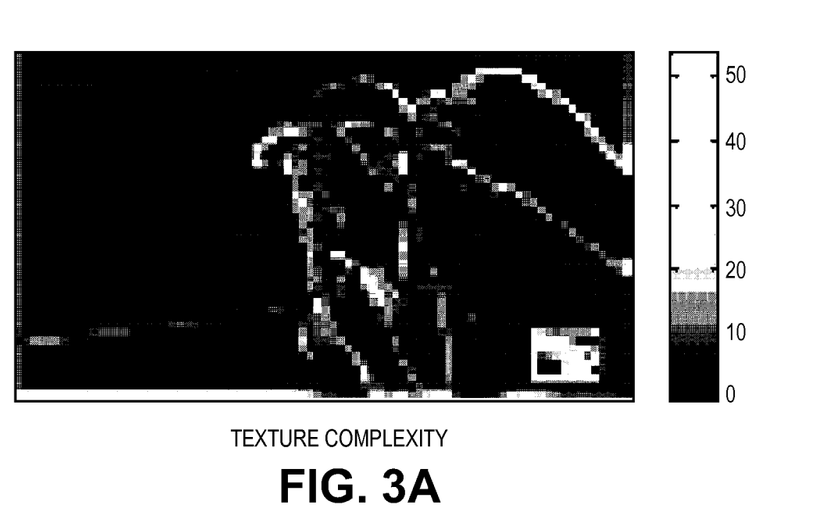
FIG. 3a shows an exemplary texture complexity of a video content.
Figure 3B:
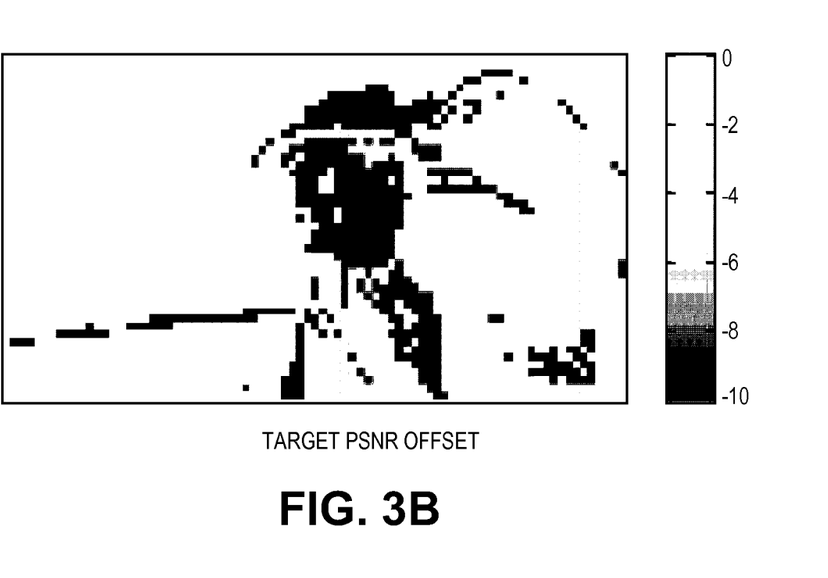
FIG. 3b shows an exemplary target PSNR offset shape of a video content.
Figure 3C:
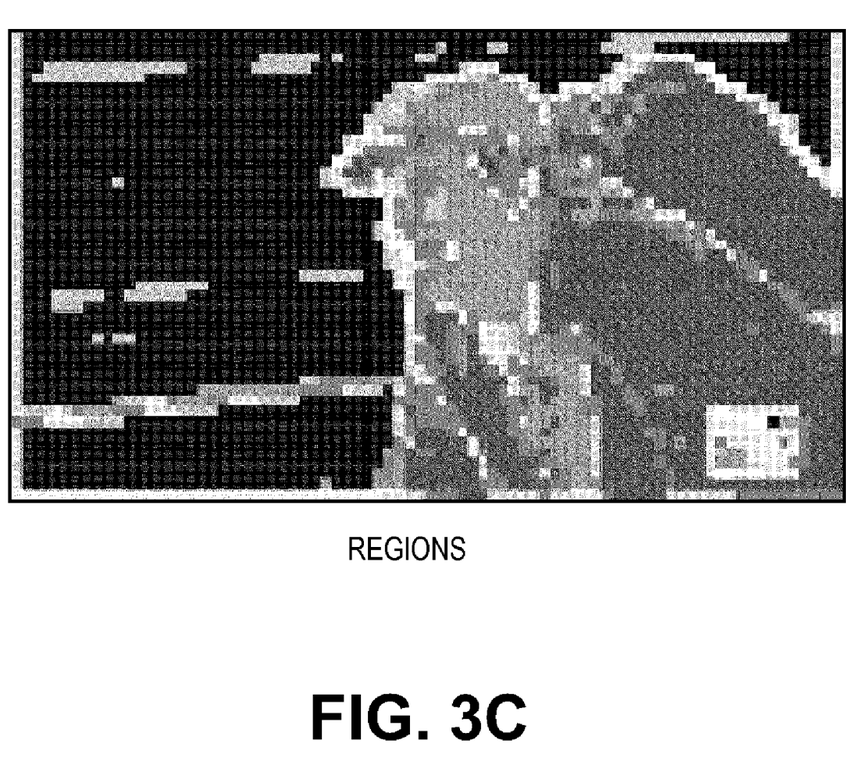
FIG. 3c Shows segmentation the video content into ten regions by vector quantization of texture complexity.

The selection of regions is performed by means of vector quantization or clustering. The process of vector quantization configured according to the invention is shown in FIG. 2. The video content in this example is a frame 100. The frame is divided into sub-frame units as shown as small squares in FIG. 2. Each sub-frame unit is in this example is a macroblock. According to the invention, the frame could be divided up in other ways. The values $x_i = (\Delta p_i, v_i)$ for all the macroblocks $i = 1, \ldots, N_T$ in the frame are clustered in $\mathbb{R}^2$, where $v_i$ is the horizontal axis and $\Delta p_i$ is the vertical axis. Each macroblock is mapped into the $\mathbb{R}^2$ space according to their values ($\Delta p_i$, $\upsilon_i$). Mapping 112 and mapping 114 correspond to two macroblocks with similar values ($\Delta p_j, \upsilon_j$) and ($\Delta p_i, \upsilon_i$), respectively. All the data points corresponding to values ($\Delta p_i, \upsilon_i$) in the $\mathbb{R}^2$ space are partitioned into a plural number of regions $R_1, \ldots, R_{N_{REG}}$ labeled as 130 to 190 accordingly. The clustering is performed by minimizing the intra-cluster variance, $$\{R_1, \ldots, R_{N_{REG}}\} = \underset{\{R_1, \ldots, R_{N_{REG}}\}}{\mathrm{argmin}} \sum_{k=1}^{N_{REG}} \sum_{i \in R_k} |x_i - c_k|^2 \quad (16)$$

where $c_k$ is the centroid of the points corresponding to region $R_k$. An example of such a labeling is shown in FIG. 3, where Segmentation into ten regions (bottom), performed by vector quantization of texture complexity (top left) and target PSNR offset shape (top right) is illustrated. A commonly used iterative heuristic to solve the clustering problem (21) is the Max-Lloyd algorithm as described in the book entitled *Vector Quantization and Signal Compression*, Springer, 1992, by A. Gersho and R. M. Gray. The vector quantization is described as follows:

initialization: Number of regions $N_{REG}$, initial partitioning of the points $\{x_1, \ldots, x_{N_{MB}}\}$ into $N_{REG}$ clusters.

1. repeat
2. Compute the centroids $$c_k = \frac{1}{|R_k|} \sum i \in R_k^{x_i}$$

of each cluster $R_k$

3. Construct new clusters by associating each point with the closest centroid, $$R_k = \{i | \|x_i - c_k\|_2 \leq \|x_i - c'_k\|_2 \forall k' \neq k\},$$

4. until convergence

Figure 4:
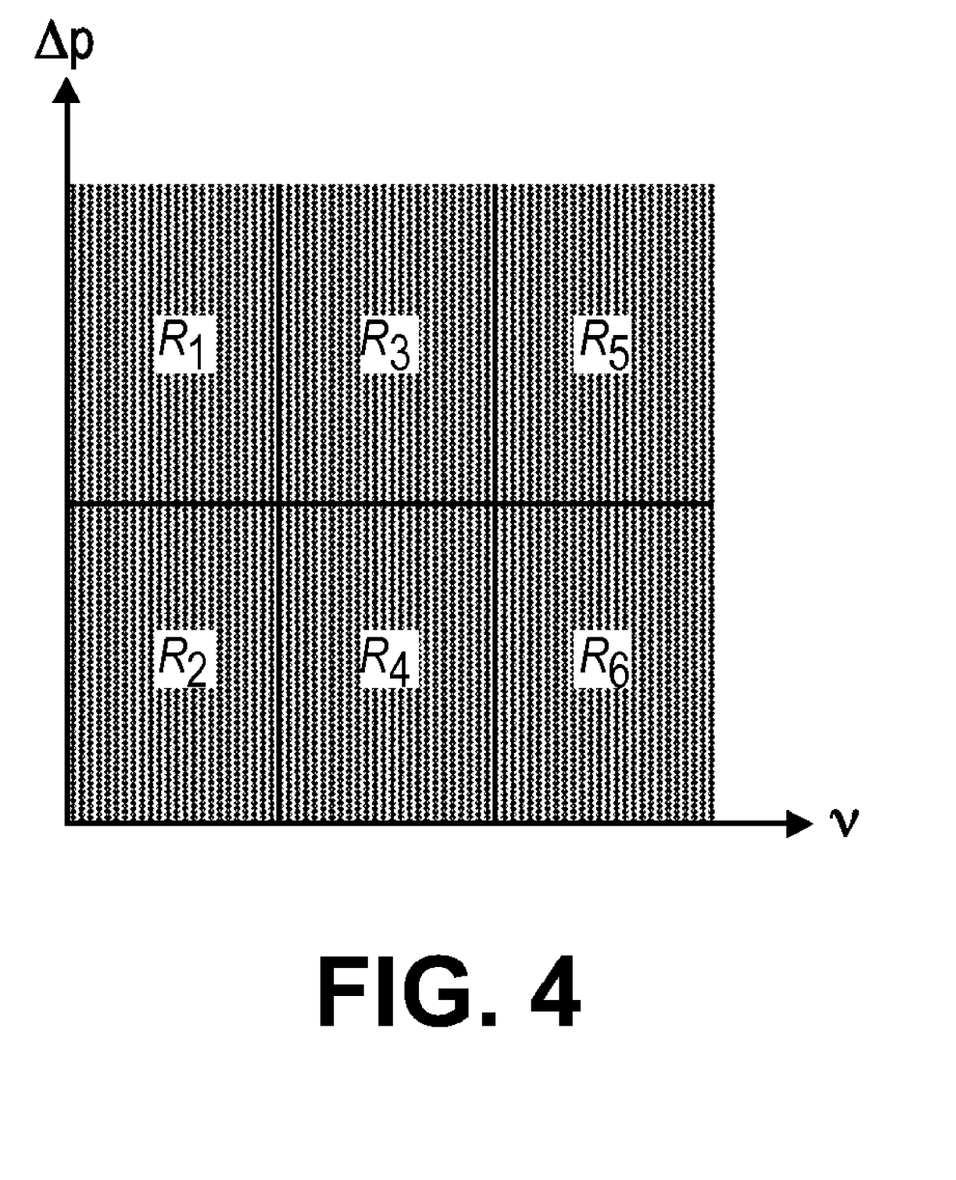
FIG. 4 shows a region partition by suboptimal vector quantization.

A suboptimal yet computationally more efficient way of solving the clustering problem (16) is dividing the ($\Delta p, \upsilon$) plane into fixed regions, as shown in FIG. 4, where the regions are formed by dividing both the horizontal axis and vertical axis into fixed intervals. Such a procedure is not iterative, and in most cases produces regions similar to those computed using vector quantization.

It should be noted that the regions produced by the vector quantization are not necessarily continuous in space. In some cases, it may be desired to enforce some continuity constraints. For example, one can apply morphological operations on the regions map obtained as the result of vector quantization. An alternative is to merge regions with similar property and area smaller than some threshold.

The number of regions $N_{REG}$ is a controller parameter, usually pre-set. A reasonable selection of $N_{REG}$ is the number of distinct integer quantization parameter values that may occur in a frame. Typically, values in the range $q'_0 - 3, \ldots, q' + 3$ are used ($q'_0$ being the initial quantization parameter given by the sequence-level controller) and thus, $N_{REG} = 7$ may be used is this case.

The amount of bits required to encode the macroblocks in region k is given by $$\hat{b}_k^r(q_k; \overline{\alpha}_k) = \sum_{i \in R_k} \hat{b}_i(q_k; \overline{\alpha}_i) \quad (17)$$

$$= \sum_{i \in R_k} \overline{\alpha}_{i1} + \overline{\alpha}_{i2} q_k^{-1}$$

$$= \overline{\alpha}_{k1}^r + \overline{\alpha}_{k2}^r q_k^{-1}$$

where $\alpha_k^r = \Sigma_{i \in R_k} \alpha_i$ is used to denote the coefficients of the region-wise model. In the following, is consistently used in k referring to regions and the index i referring to macroblocks, in order to avoid cumbersome notation. Thus, the region-wise bit production model is linear. In the same way, the predicted average PSNR in the region k is given by $$\hat{P}_k^r(q'_k; \overline{\beta}_k) = \frac{1}{|R_K|} \sum_{i \in R_k} \hat{p}i(q'_k; \overline{\beta}_i) \quad (18)$$

$$= \frac{1}{|R_K|} \sum_{i \in R_k} \overline{\beta}_{i1} + \overline{\beta}_{i2} q'_k$$

$$= \overline{\beta}_{k1}^r + \overline{\beta}_{k2}^r q'_k$$

where $\beta_k^r = (1/|R_k|) \Sigma_{i \in R_k} \beta_i$. Note that the average PSNR is computed by averaging the PSNR values rather than averaging the corresponding MSE values and then taking the logarithmic transformation. Even though less accurate, we still prefer this way since it leads to a linear model.

After the frame is segmented into regions, the PSNR shaping problem is solved in a region-wise manner, assigning a constant quantization parameter to each region. It is assumed to be given some initial value $q'_0$ of the quantization parameter allocated by the sequence-level controller for the entire frame and the bit budget $b_T$. The vector of the region-wise values of the quantization parameter are denoted by $q'^r = (q'_1{}^r, \ldots, q'_{N_{REG}}{}^r)$. Instead of working with the quantization parameter $q'$, we work with quantization parameter difference $\Delta q' = q' - 1 \cdot q'_0$ is used. We demand the values of the quantization parameter difference to vary in the hypercube $[\Delta q'_{min}{}^r, \Delta q'_{max}{}^r]$, which is typically chosen as $[-2,2]^{N_{REG}}$ or $[-3,3]^{N_{REG}}$.

The problem of PSNR shaping is formulated as follows, $$\min \|\hat{p}^r(\Delta q'^r) - (\delta + \Delta p^r)\| - p_0 \quad \text{s.t.} \quad 1^T \hat{b}^r(\Delta q') = b_T \quad (19)$$

$$\Delta q'^r \in R^{N_{REG}, p0} \qquad \Delta q'^r_{min} \leq \Delta q'^r \leq \Delta q'^r_{max}$$

where $\Delta q'^r = (\Delta q'_1{}^r, \ldots, \Delta q'^r_{N_{REG}})^T$, $\hat{b}^r = (\hat{b}_1{}^r, \ldots, \hat{b}_{N_{REG}}{}^r)^T$ and $\hat{p}^r = (\hat{p}_1{}^r, \ldots, \hat{p}^r_{N_{REG}})^T$ are the vectors of quantization parameter difference, predicted number of bits and predicted PSNR in the regions, and $$\Delta p^r = (\hat{p}_1^r, \ldots, \hat{p}^r_{N_{REG}}), \Delta p_k^r = \frac{1}{|R_K|} \sum_{i \in R_k} \Delta p_i \quad (20)$$

is the region-wise average of the PSNR shape.

The PSNR predictor in region k, expressed as a function of $\Delta q'^r$, is given as the following expression, $$\hat{p}_k^r(\Delta q_k'^r; \tilde{\beta}_k) = \overline{\beta}_{k1}^r + \overline{\beta}_{k2}^r(q_k'^r + q_0')$$
$$= (\overline{\beta}_{k1}^r + \overline{\beta}_{k2}^r q_0') + \overline{\beta}_{k2}^r \Delta q_k'^r$$
$$= \tilde{\beta}_{k1}^p + \overline{\beta}_{k2}^r \Delta q_k'^r \quad (21)$$

where $\tilde{\beta}_k^p = (\overline{\beta}_{k1}^r + \overline{\beta}_{k2}^r q_0', \overline{\beta}_{k2}^r)^T$—On the other hand, the predictor of the amount of bits is linear in q but non-linear in $\Delta q^{-1}$. In order to simplify expressions, we linearize $q^{-1}$ (q') around q'$_0$, $$q^{-1}(q_0' + \Delta q') \approx \frac{1}{.085} \cdot 2^{-(q_0'-12)/6}\left(1 - \frac{\log 2}{6}\Delta q'\right) \quad (22)$$

and substitute it to the predictor, obtaining $$\hat{b}_k^r(\Delta q_k'^r; \overline{\alpha}_k^r) = \overline{\alpha}_{k1}^r + \overline{\alpha}_{k2}^r(q_k'^r)^{-1} \quad (23)$$
$$\approx \left(\overline{\alpha}_{k1}^r + \frac{\overline{\alpha}_{k2}^r}{0.85} \cdot 2^{-\frac{q_0'-12}{6}}\right) - \frac{\log 2 \cdot \overline{\alpha}_{k2}^r}{5.1} \cdot$$
$$2^{-\frac{(q_0'-12)}{6}} \Delta q_k'^r$$
$$= \tilde{\alpha}_{k1}^r + \tilde{\alpha}_{k2}^r \Delta q_k'^r$$

where $\tilde{\alpha}_k^r = \left(\tilde{\alpha}_{k1}^r + \frac{\overline{\alpha}_{k2}^r}{0.85} \cdot 2^{-\frac{(q_0'-12)}{6}}, -\frac{\log 2 \cdot \overline{\alpha}_{k2}^r}{5.1} \cdot 2^{-\frac{(q_0'-12)}{6}}\right)^T.$ Assuming that the weighted L1-norm is used in problem (20) and plugging the above expressions, we get $$\min_{\Delta q'^r \in R^{N_{REG},p_0}} \sum_{k=1}^{N_{REG}} w_k |\tilde{\beta}_{k1}^r + \tilde{\beta}_{k2}^r \Delta q_k'^r - (p_0 + \Delta p_k^r)| - p_0 \quad \text{s.t.} \quad \sum_{k=1}^{N_{REG}} \overline{\alpha}_{k1}^r + \overline{\alpha}_{k2}^r \Delta q_k'^r = b_T \quad (24)$$
$$\Delta q_{min}'^r \leq \Delta q'^r \leq \Delta q_{max}'^r$$

where $w = (w_1, \ldots, w_{N_{REG}})^T$ is a vector of non-negative weights proportional to the region size ($w_k \propto |R_k|$).

By introducing artificial variables, problem (30) can be posed as linear programming (LP) problem with $2N_{REG}+1$ variables, one equality constraint and $2 N_{REG}+1$ inequality constraints, as follows, $$\min_{x \in R^{2N_{REG}+1}} c^T x \quad \text{s.t.} \quad a_{eq}^T x = b_T - \sum_{k=1}^{N_{REG}} \tilde{\alpha}_{k1}^r \quad (25)$$
$$A_{neq} x \leq b_{neq}$$

where $z \in R^{N_{REG}}$ is a vector of artificial variables, $$x = \begin{pmatrix} \Delta q'^r \\ p_0 \\ z \end{pmatrix}; \quad c = \begin{pmatrix} 0 \\ -1 \\ w \end{pmatrix};$$

and $$A_{neq} = \begin{pmatrix} \tilde{\beta}_{12}^r & & & -1 & -1 & \\ & \ddots & & & \vdots & \ddots \\ & & \tilde{\beta}_{N_{REG},2}^r & -1 & & -1 \\ -\tilde{\beta}_{12}^r & & & 1 & -1 & \\ & \ddots & & & \vdots & \ddots \\ & & \tilde{\beta}_{N_{REG},2}^r & 1 & & -1 \\ 1 & & & & & \\ & \ddots & & & & \\ & & 1 & & & \\ -1 & & & & & \\ & \ddots & & & & \\ & & -1 & & & \end{pmatrix};$$

$$b_{neq} = \begin{pmatrix} \Delta p_1^r - \tilde{\beta}_{11}^r \\ \vdots \\ \Delta p_{N_{REG}}^r - \tilde{\beta}_{N_{REG},1}^r \\ -\Delta p_1^r + \tilde{\beta}_{11}^r \\ \vdots \\ \Delta p_{N_{REG}}^r + \tilde{\beta}_{N_{REG},1}^r \\ \Delta q_{max}'^r \\ -\Delta q_{min}'^r \end{pmatrix}$$

and $$a_{eq} = \begin{pmatrix} \tilde{\alpha}_{12}^r \\ \vdots \\ \tilde{\alpha}_{N_{REG},2}^r \\ 0 \\ 0 \end{pmatrix}$$

The solution of problem (25) gives the region-wise map of quantization parameter differences, $\Delta q_k'^r$, from which the quantization parameter $q'^r = 1 \cdot q_0' + \Delta q'^r$ is computed. Since linearization of the bit predictor is used, a discrepancy in the predicted amount of bits may occur. In order to avoid such errors, an iterative linearization scheme is used: once the value of $q_k'^r$ is computed, the linearization of $\hat{b}_k^r$ in region k is performed around $q_k'^r$ rather than around $q_0'^r$. The process is repeated until the quantization parameter stops changing significantly. The entire scheme can be summarized as follows, initialization: Initial quantization parameter in each region $q'^r = q_0' \cdot 1$; some quantization parameter difference interval $[\Delta q_{min}'^r, \Delta q_{max}'^r] = [-\Delta q_0, \Delta q_0']^{N_{REG}}$ 1. repeat
2. Compute the parameters $\tilde{\alpha}_1^r, \ldots, \tilde{\alpha}_{N_{REG}}^r$ by linearizing the bits predictor in each region around $q'_k^r$ according to (23)
3. Compute the quantization parameter differences $\Delta q'_k^r$ by solving the LP problem (25) for $\Delta q'_k^r$ in the range $[\Delta q'_{min}{}^r, \Delta q'_{max}{}^r]$
4. Update the quantization parameter difference range $\Delta q'_{min}{}^r \leftarrow \Delta q'_{min}{}^r - \Delta q'^r$ and $\Delta q'_{max}{}^r \leftarrow \Delta q'_{max}{}^r - \Delta q'^r$
5. Set $\Delta q'_{max}{}^r \leftarrow \Delta q'_{max}{}^r - \Delta q'^r$
6. until $\|\Delta q'^r\| \leqq \epsilon$ Note that the values $q'_k^r$ produced in this way can be non-integer, while in practice the encoder works only with integer quantization parameters. Hence, there is a need to round the obtained result to the closest integer.

Denoting by $$q_0 = 0.85 \cdot 2^{\frac{q_k'^r - 12}{6}}$$

the quantization step corresponding to the quantization parameter $q'_0$ we can translate the quantization parameter difference $\Delta q'_k^r$ into a multiplicative factor, $$\mu_k^r = \frac{q_k^r}{q_0} = 2^{\frac{q_k'^r - q_0'}{6}}$$

referred here to as the quantization step multiplier, such that $q_k^r = q_0 \cdot \mu_k^r$.

The optimal quality criterion based on PSNR shaping by using iterative linearization of the bit product model will converge to a solution when $\Delta q'^r$ becomes very small. The range $[\Delta q'_{min}{}^r, \Delta q'_{max}{}^r]$ contains a small number of choices and the number of regions is also designed to be small. Therefore, a tractable optimal solution has been developed The invention may also involve a number of functions to be performed by a computer processor, which may be as simple as combinatorial logic, or may include more complex devices such as a microprocessor. The microprocessor may be a specialized or dedicated microprocessor that is configured to perform particular tasks by executing machine-readable software code that defines the particular tasks. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of computers, such as computer servers, that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, or any commonly used protocol for storing and retrieving information to and from these memory devices respectively.

The apparatus and method include a method and apparatus for providing an improved encoding process for video. Although this embodiment is described and illustrated in the context of devices, systems and related methods of authenticating devices, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles of the invention and the scope, which is defined by the appended claims and their equivalents.

The invention claimed is:

1. A method of encoding video content, comprising:
providing input video content;
providing a resource budget;
partitioning the video content into regions; and
generating optimal encoding parameters for the regions to enable an encoder to produce an encoded version of the video content with maximum quality criterion within the provided resource budget,
wherein the encoding parameters are divided into sets of parameters associated with each region, and
wherein the step of providing encoding parameters to enable an encoder to produce the encoded version of the video content with maximum quality criterion within the resource budget is performed by solving a optimization problem $$\{\vartheta_1^*, \ldots, \vartheta_L^*\} = \underset{\{\vartheta_1^*, \ldots, \vartheta_L^*\}}{\operatorname{argmax}} f(q_1(\vartheta_1; y_1, v_1), \ldots, q_L(\vartheta_L; y_L, v_L))$$

subject to $$\sum_{l=1}^{L} \bar{r}_l(\vartheta_l; y_l, v_l) \leq \bar{R}^0,$$

Where $\{\theta_1^*, \ldots \theta_L^*\}$ is the optimal set of encoder parameters for the regions; $\bar{r}_l(\theta_l; y_l, v_l)$ is the vector of resources used by the encoder for encoding the input video content $y_l$ in region 1 with the set of encoder parameters $\theta_l$; $q_l(\theta_l; y_l, v_l)$ is the video quality criterion in region 1 as the result of encoding of video content $y_l$ with the set of encoder parameters $\theta_l$, $v_l$ is the additional information associated with region 1, and f is an aggregation function.

2. The method of claim 1, wherein the encoding parameters in each region include the quantization parameters of a macroblock belonging to the region.

3. The method according to claim 1, wherein the aggregation function is one of the following functions including sum, weighted sum, maximum, minimum, thresholded sum, sum of squares, or a combination thereof.

4. The method according to claim 1, wherein the aggregation function is $$f(q_1, \ldots, q_L) = \sum_{l=1}^{L} q_l.$$

5. the method according to claim 1, wherein the aggregation function is $$f(q_1, \ldots, q_L) = \sum_{l=1}^{L} w_l q_l,$$

and $w_l$ is a weight proportional to the region size.

6. The method according to claim 1, wherein additional side information includes description of the input video content complexity and is computed using the input video content.

7. The method according to claim 1, wherein additional side information includes data related to previous operation of the encoder.

8. The method according to claim 1, wherein additional side information is computed during the encoding process.

9. The method according to claim 1, wherein additional side information is pre-computed.

10. The method according to claim 1, wherein additional side information includes visual clues.

11. The method according to claim 1, wherein the resource budget is a bit budget.

12. The method according to claim 1, wherein the resource budget is chosen from a group of resources including a bit budget, limited processing time, limited power dissipation, limited encoding time, limited decoding time, limited data, limited memory use, limited memory bandwidth, limited data redundancy, limited repeat information.

13. The method according to claim 1, wherein the quality criterion is negatively proportional to a video distortion metric.

14. The method according to claim 1, wherein the quality criterion is a measure of proximity of a distortion criterion to a given distortion shape.

15. The method according to claim 14, wherein the quality criterion further contain a distortion offset parameter, and is both a measure of proximity of a distortion criterion to a given distortion shape and the size of the offset.

16. The method according to claim 13, wherein the distortion metric is based on a visual perception model.

17. The method according to claim 1, wherein the quality criterion is peak signal-to-noise ratio (PSNR).

18. The method according to claim 1, wherein the quality criterion is a measure of uniformity of PSNR within a frame.

19. The method according to claim 14, wherein the desired distortion shape is a minimum noticeable distortion of the video content.

20. The method according to claim 1, wherein the video content includes a subset of a video frame.

21. The method according to claim 1, wherein the video content includes pixel content within a video frame.

22. The method according to claim 1, wherein the video content includes at least one entire video frame.

23. The method according to claim 1, wherein the video content includes slices within a video frame.

24. The method according to claim 1, wherein the partitioning the video content into regions are formed by grouping sub-frame units of the video content into regions.

25. The method of claim 24, wherein the sub-frame units are at least one of a pixel, a group of pixels, a rectangular block of pixels, a macroblock, and a plurality of macroblocks.

26. The method according to claim 15, wherein the step of providing encoding parameters to enable an encoder to produce the encoded version of the video content with maximum quality criterion within the resource budget is performed by simultaneously minimizing the distortion and the distortion offset.

27. The method according to claim 26, wherein the step of simultaneously minimizing the distortion and the distortion offset is performed by solving a multicriterion optimization problem $$\{\vartheta_1^*, \ldots, \vartheta_L^*\} = \operatorname*{argmin}_{\{\vartheta_1, \ldots, \vartheta_L\}, d_0}$$

$$\{\|(d_1(\vartheta_1; y_1, v_1), \ldots, d_L(\vartheta_L; y_L, v_L)) - (d_0 + (\Delta d_1, \ldots, \Delta d_L))\|, d_0\}$$

$$\text{subject to } \sum_{l=1}^{L} \bar{r}_l(\vartheta_l; y_l, v_l) \le \bar{R}^0,$$

where $\{\theta^*_1, \ldots, \theta^*_L\}$ is the optimal set of encoder parameters for the regions; $\bar{r}_l(\theta_l; y_l, v_l)$ is the vector of resources used by the encoder for encoding the input video content $y_l$ in region 1 with the set of encoder parameters $\theta_l$; $d_l(\theta_l; y_l, v_l)$ is the video distortion criterion in region 1 as the result of encoding of video content $y_l$ with the set of encoder parameters $\theta_l$, $\|\cdot\|$ is a norm, $d_0$ is the distortion offset, $\Delta d_l$ is the desired distortion shape in region 1, and $v_l$ is the additional information associated with region 1.

28. The method according to claim 27, wherein the step of solving the multi-criterion optimization problem is performed by aggregating the two components of an objective function and minimizing the aggregate.

29. The method according to claim 27, wherein the desired distortion shape in each region is the minimum noticeable distortion of the video content in each region.

30. The method according to claim 27, wherein the distortion criterion in each region is negatively related to PSNR $p_l$, the desired distortion shape $\Delta d_l$ in each region is negatively related to the desired PSNR shape $\Delta p_l$, and the distortion offset $d_0$ is negatively related to PSNR offset $p_0$.

31. The method according to claim 1, wherein the encoded video quality is predicted without employing the encoder.

32. The method according to claim 1, wherein at least one or more of the resources utilized by the encoder for encoding the input video content is predicted without employing the encoder.

33. The method according to claim 1, wherein both the encoded video quality and resources utilized by the encoder for encoding the input video content are predicted without employing the encoder.

34. The method according to claim 33, wherein the prediction is parametric controlled by a set of predictor parameters.

35. The method according to claim 34, wherein the predictor parameters are fixed.

36. The method according to claim 34, wherein the predictor parameters are changed during the operation of the encoder in such a way to improve the performance of the predictor.

37. The method according to claim 27, wherein the distortion criterion in region 1 is the prediction of the distortion of the encoded video content in region 1 of the form $$\hat{d}_l(\theta_l; v_l) \approx d_l(\theta_l; y_l, v_l),$$

computed without employing the encoder.

38. The method according to claim 37, wherein the distortion criterion in region 1 is negatively related to the prediction of PSNR of the encoded video content in region 1, computed without employing the encoder.

39. The method according to claim 38, wherein the prediction of PSNR of the encoded video content in region 1 is a parametric linear function of the form $$\hat{p}_l(\theta_l; v_l) = \alpha_1 + \alpha_2 \theta_l + \alpha_3 v_l$$

where $\alpha_1$, $\alpha_2$, $\alpha_3$ are the predictor parameters.

40. The method according to claim 30, wherein the additional information $v_l$ is a visual clue in the region 1.

41. The method according to claim 38, wherein the PSNR predictor in the region 1 is the sum of PSNR predictors in sub-frame units of which region 1 consists, $$\hat{p}_l(\vartheta_l; v_l) = \sum_{i \in \mathcal{R}_l} \hat{p}_i(\theta_i; v_i),$$

where $\mathcal{R}_l$ is the set of the indices of sub-frame units belonging to region 1.

42. The method according to claim 27, wherein the vector of resources for region 1 includes the amount of bits required to encode the input video content in region 1, which is predicted using a function of the form $$\hat{b}_i(\theta_i; v_l) \approx b_i(\theta_i; y_l, v_l),$$

computed without employing the encoder.

43. The method according to claim 42, wherein the prediction of the amount of bits in region 1 is a parametric linear function of the form $$\hat{b}_l(\theta_l; v_l) = \beta_1 + \beta_2 \theta_l + \beta_3 v_l$$

where $\beta_1$, $\beta_2$, $\beta_3$ are the predictor parameters.

44. The method according to claim 43, wherein the additional information $v_l$ is a visual clue in the region 1.

45. The method according to claim 42, wherein the predictor of the amount of bits in the region 1 is the sum of predictors of the amount of bits in sub-frame units of which region 1 consists, $$\hat{b}_l(\vartheta_l; v_l) = \sum_{i \in \mathcal{R}_l} \hat{b}_i(\theta_i; v_i),$$

where $\mathcal{R}_l$ is the set of the indices of sub-frame units belonging to region 1.

46. The method according to claim 33, wherein the step of providing encoding parameters to enable an encoder to produce the encoded version of the video content with maximum quality criterion within a bit budget is performed by solving the optimization problem $$\{\vartheta_1^*, \ldots, \vartheta_L^*\} = \operatorname*{argmax}_{\{\vartheta_1, \ldots, \vartheta_L\}, d_0}$$

$$\|(\hat{p}_1(\vartheta_1; v_1), \ldots, \hat{p}_L(\vartheta_L; v_L)) - (p_0 + (\Delta p_1, \ldots, \Delta p_L))\| + \lambda p_0$$

$$\text{subject to } \sum_{l=1}^{L} \hat{b}_l(\theta_l; v_l) \leq B^0,$$

where $\{\theta^*_1, \ldots, \theta^*_L\}$ is the optimal set of encoder parameters for the regions; $\hat{b}_l(\theta_l; v_l)$ is the predicted amount of bits used by the encoder for encoding the input video content $y_l$ in region 1 with the set of encoder parameters $\theta_l$; $B^0$ is the budget of bits; $\hat{p}_l(\theta_l; v_l)$ is the predicted PSNR in region 1 as the result of encoding of video content $y_l$ with the set of encoder parameters $\theta_l$, $\|\cdot\|$ is a norm, $p_0$ is the PSNR offset, $\Delta p_l$ is the desired distortion shape in region 1, $v_l$ is the additional information associated with region 1; and $\lambda$ is a scalar multiplier.

47. The method according to claim 46, wherein the encoder parameters $\theta_l$ in the region 1 is a quantization parameter.

48. The method according to claim 47, wherein the range of the values which a quantization parameter is constrained.

49. The method according to claim 46, wherein at least one of the PSNR and the bit predictors in the region 1 are non-linear with respect to $\theta_l$.

50. The method according to claim 46, wherein initial quantization parameters for the regions are provided.

51. The method according to claim 50, wherein the non-linear predictors are linearized around an initial value of the quantization parameters.

52. The method according to claim 51, wherein the linearization of the nonlinear predictor is refined iteratively by improving an initial value of the quantization parameters.

53. The method according to claim 46, wherein the additional information in region 1 $v_l$ is (i) a measure of texture complexity in the region 1 if the input video content is part of an I-picture or (ii) a measure of motion complexity in the region 1 relative to the corresponding regions in the reference picture if the input video content is part of or a P-picture.

54. The method according to claim 53, wherein the texture complexity in region 1 is one of (i) the variance of the luma pixels in region 1, (ii) the standard deviation of the luma pixels in region 1 and (iii) the total variation of the luma pixels in region 1.

55. The method according to claim 53, wherein the motion complexity in region 1 is one of (i) sum of the norms of the motion vectors between the pixels of region 1 and the corresponding pixels in the reference pictures, (ii) a difference between the pixels of region 1 and the corresponding pixels in the reference pictures and (iii) a difference between the filtered pixels of region 1 and the corresponding filtered pixels in the reference pictures.

56. The method according to claim 1, wherein the additional information in region 1 is an aggregation of the additional information in sub-frame data units belonging to region 1.

57. The method according to claim 24, wherein the partitioning is according to a set of parameters associated with the sub-frame units.

58. The method according to claim 46, wherein the set of parameters of the sub-frame units includes quantization parameter and macroblock type.

59. The method according to claim 57, wherein the partitioning utilizes vector quantization.

60. The method according to claim 59, wherein the step of vector quantization is performed in a two-dimensional vector space, $x_i=(\Delta p_i, v_i)$, where $\Delta p_i$ is the PSNR shape in the sub-frame unit i, and $v_i$ is side information in the sub-frame unit i.

61. The method according to claim 59, wherein the step of partitioning includes partitioning of the two-dimensional vector space, $x_i=(\Delta p_i, v_i)$, where $\Delta p_i$ is the PSNR shape in the sub-frame unit i, and $v_i$ is a measure of content complexity in the sub-frame unit i, into fixed regions.

* * * * *